US011203547B2

(12) United States Patent
Corrado et al.

(10) Patent No.: US 11,203,547 B2
(45) Date of Patent: Dec. 21, 2021

(54) HOLLOW CORE OPTICAL FIBER WITH CONTROLLED DIAMETER HOLLOW REGIONS AND METHOD OF MAKING THE SAME

(71) Applicant: OFS Fitel, LLC, Norcross, GA (US)

(72) Inventors: Matt Corrado, Flemington, NJ (US); David J DiGiovanni, Mountain Lakes, NJ (US); Brian Mangan, Hopewell, NJ (US); Gabriel Puc, Lebanon, NJ (US); Robert S Windeler, Annandale, NJ (US)

(73) Assignee: OFS FITEL, LLC, Norcross, GA (US)

( * ) Notice: Subject to any disclaimer, the term of this patent is extended or adjusted under 35 U.S.C. 154(b) by 229 days.

(21) Appl. No.: 16/042,247

(22) Filed: Jul. 23, 2018

(65) Prior Publication Data

US 2020/0024178 A1 Jan. 23, 2020

(51) Int. Cl.
*C03B 37/025* (2006.01)
*G02B 6/02* (2006.01)

(52) U.S. Cl.
CPC ...... *C03B 37/0253* (2013.01); *C03B 37/0256* (2013.01); *G02B 6/02304* (2013.01)

(58) Field of Classification Search
None
See application file for complete search history.

(56) References Cited

U.S. PATENT DOCUMENTS

| 5,802,236 | A | 9/1998 | DiGiovanni et al. |
| 5,907,652 | A | 5/1999 | DiGiovanni et al. |
| 6,917,741 | B2 | 7/2005 | Fekety et al. |
| 6,985,661 | B1 | 1/2006 | Russell et al. |
| 7,379,648 | B1 | 5/2008 | Brooks et al. |
| 7,567,742 | B2 | 7/2009 | Pickrell et al. |
| 7,769,263 | B1 | 8/2010 | Bennett et al. |
| 7,900,481 | B2 | 3/2011 | Gallagher et al. |
| 8,133,593 | B2 | 3/2012 | Carberry et al. |
| 8,196,435 | B2 | 6/2012 | Mukasa |
| 9,416,042 | B2 | 8/2016 | Gibson et al. |
| 2003/0230118 | A1 | 12/2003 | Dawes et al. |
| 2005/0074215 | A1* | 4/2005 | Sanghera .......... C03B 37/02781 385/125 |
| 2005/0238301 | A1* | 10/2005 | Russell ............. C03B 37/02781 385/113 |
| 2005/0276556 | A1 | 12/2005 | Williams et al. |
| 2006/0088260 | A1 | 4/2006 | Williams et al. |

(Continued)

*Primary Examiner* — Lisa L Herring
(74) *Attorney, Agent, or Firm* — Wendy W. Koba, Esq.

(57) ABSTRACT

A technique for fabricating a hollow core optical fiber with a controllable core region (in terms of diameter) is based upon regulating conditions (gas flow, volume, and/or temperature) within the hollow core region during the fiber draw process. The introduction of a gas, or any change in volume or temperature of the hollow core region, allows for the diameter of the hollow core region to self-regulate as a multistructured core rod (MCR) is drawn down into the final hollow core optical fiber structure. This self-regulation provides a core region having a diameter that selected and then stabilized for the duration of the draw process. The inventive process is also useful in controlling the diameter of any selected hollow region of an MCR including, but not limited to, shunts and corner capillaries disposed around the core region.

13 Claims, 9 Drawing Sheets

(56) References Cited

U.S. PATENT DOCUMENTS

| | | |
|---|---|---|
| 2006/0096325 A1 | 5/2006 | Kinoshita et al. |
| 2010/0303429 A1 | 12/2010 | Gibson et al. |
| 2013/0182999 A1* | 7/2013 | Jacobsen ............... C03B 37/029 |
| | | 385/43 |
| 2016/0002089 A1 | 1/2016 | Matsuo et al. |
| 2016/0252673 A1* | 9/2016 | Fini .................... G02B 6/02338 |
| | | 385/11 |
| 2017/0248757 A1 | 8/2017 | DiGiovanni et al. |
| 2020/0115270 A1* | 4/2020 | Yoo ..................... C03B 37/0122 |

* cited by examiner

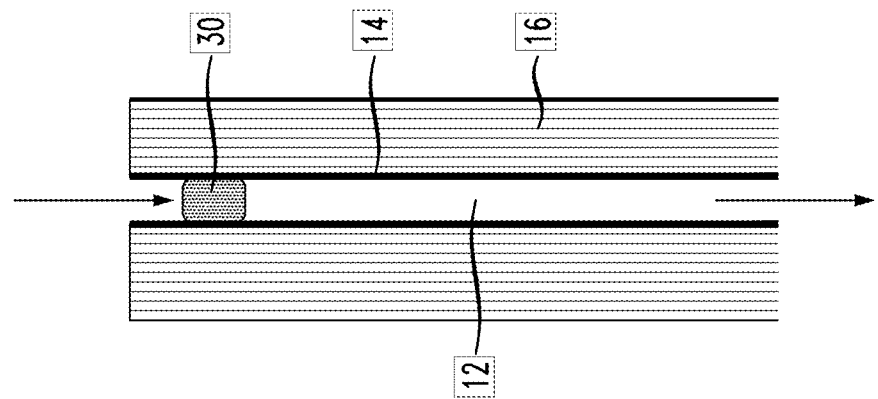
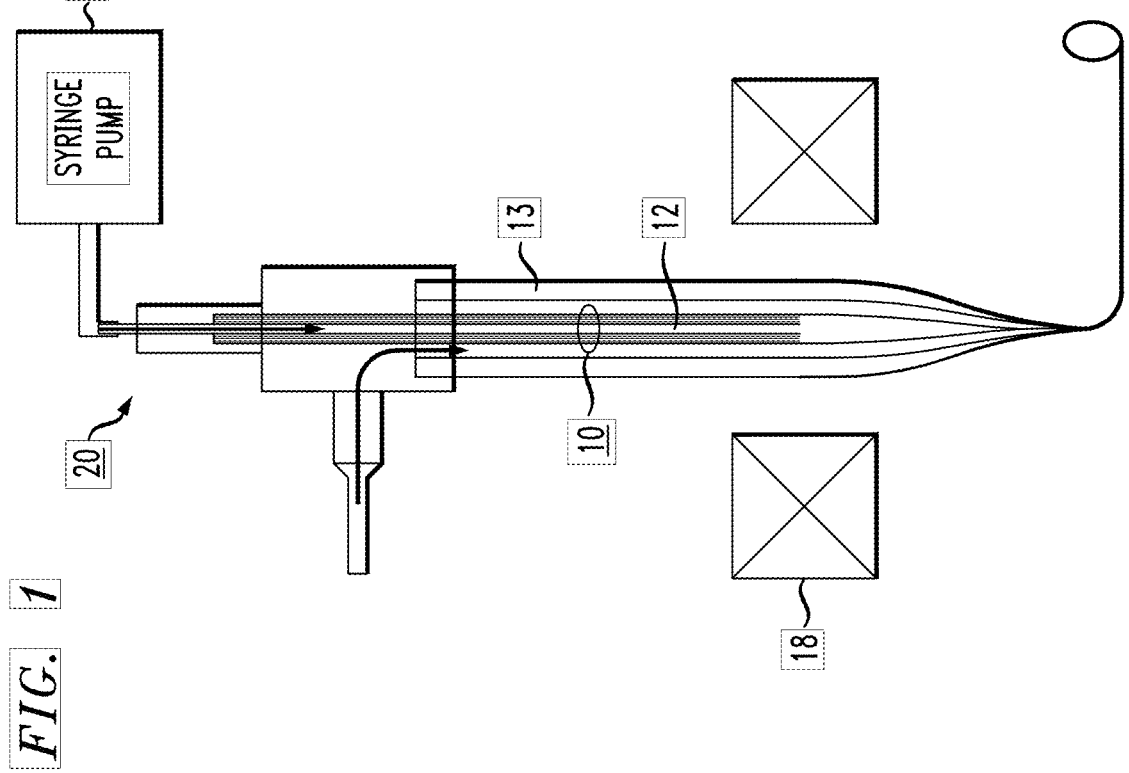

HOLLOW CORE OPTICAL FIBER WITH CONTROLLED DIAMETER HOLLOW REGIONS AND METHOD OF MAKING THE SAME

TECHNICAL FIELD

The present invention relates to a hollow core optical fiber and, more particularly, to a technique for fabricating a hollow core optical fiber such that one or more hollow regions (such as the core region) maintain a desired diameter during the process of drawing the fiber.

BACKGROUND OF THE INVENTION

Microstructured optical fibers have continued to evolve in both structure and fabrication process in an attempt to improve the transmission and reduce the leakage of light traveling therethrough. These microstructured optical fibers include solid core photonic crystal fibers (SC-PCF) and hollow core fibers, the hollow core fibers configured as either photonic bandgap (HC-PBG) fibers or anti-resonant fibers. Like conventional optical fibers, both SC-PCF and HC-PBG fibers have a three-layer structure comprising a core area, an intermediate cladding surrounding the core area, and a jacket made of solid glass surrounding the cladding. In the case of both SC-PCF and HC-PBG fibers, the cladding is not solid (as in conventional fibers), but instead comprises a microstructured region having a periodic arrangement of glass and holes to confine the propagating light within the core of the fiber.

A hollow core bandgap optical fiber is typically made using a microstructured core rod (MCR) structure that is inserted within a glass tube and drawn down into the final fiber structure. One problem that develops when drawing down a hollow core fiber relates to the difficulty in controlling the size (diameter) of the hollow core region during the draw procedure. In a typical process of drawing a hollow core fiber, external pressure is applied to allow for the holes in the preform (cladding as well as core) to overcome the force of surface tension trying to collapse the various holes. However, the pressure needed to balance surface tension varies inversely with core diameter. In particular, as the hollow core region changes in size (either intentionally or unintentionally), the applied pressure needs to change as well in order to maintain the desired size of the core. In fact, the process using pressure control is unstable in that perturbations in size tend to grow over time if the pressure is held constant, leading to excessive fluctuations in the size of the hollow core region. Since the hollow core diameter is not monitored in real time, the pressure cannot be adjusted with sufficient sensitivity to keep the core at the correct, desired size.

One prior art solution to maintaining core size is proposed in U.S. Pat. No. 5,802,236 issued on Sep. 1, 1998, entitled "Article Comprising a Micro-Structured Optical Fiber, and Method of Making Such Fiber", issued to D. J. DiGiovanni et al. and assigned to the assignee of this application. In the method described in the '236 patent, the problem of hole collapse is overcome by sealing the far-end termination of the MCR preform, allowing the holes to self-pressurize during draw. That is, the initial collapse of the holes as the preform is being drawn raises the internal pressure in the closed (sealed) cavity, which then causes the holes to expand. Eventually, an equilibrium is achieved and the core diameter stabilizes. Perturbations in size are damped because the internal pressure changes as a result of leakage of gas from the drawn end of the fiber at the furnace exit. This leakage of gas acts like a control valve to maintain stable core size, since larger size allows for greater flow (and therefore reduces the internal pressure, causing commensurate reduction in core diameter), while small core size exhibits reduced flow.

While the self-pressurizing method can produce a hollow core fiber with uniform hole diameter, a serious disadvantage is that the core size itself cannot be readily adjusted. As is clear from the above discussion, any change that alters the amount of gas leaking through the drawn fiber will change the core size, but this is a very indirect, long timescale effect and is therefore a poor control mechanism. The ability to adjust the core size of a hollow core fiber is a desirable goal, since there are situations where the core diameter of a hollow core optical fiber needs to be adjusted to achieve desired optical properties (e.g., to obtain the desired low loss bandwidth).

Moreover, any fluctuations in process conditions during the draw have been found to affect the size of the core. Thus, a remaining need in the art is to provide a self-correcting (i.e., self-regulating, or stable) fabrication process, where the actual size of the hollow core can be adjusted, and then maintained at the adjusted size, in order to achieve the desired optical properties in the hollow core optical fiber.

SUMMARY OF THE INVENTION

The needs remaining in the prior art are addressed by the present invention, which relates to a hollow core optical fiber and, more particularly, to a technique for fabricating a hollow core optical fiber such that the core region maintains a desired diameter during the process of drawing the fiber from the starting material.

In accordance with one or more embodiments of the present invention, it has been found that by regulating one or more conditions within a hollow core region during fiber draw (the conditions including one or more of a gas flow into the hollow core, a change in volume of the hollow core region, and/or a change in temperature within the hollow core region), the core diameter self-regulates and stabilizes to maintain a desired size as the fiber is drawn. In one specific embodiment, regulation is provided by a constant flow of gas into the hollow core region of the structure as it is being drawn down into a fiber from the MCR preform. The flow rate is controlled, in accordance with the principles of the present invention, to provide and maintain a desired core diameter within the final hollow core optical fiber. As will be described hereinbelow, it has been found that the introduction of a gaseous flow allows for self-regulation of the core diameter as other draw parameters may vary (e.g., changes in draw tension, draw temperature, draw speed, and the like), leading to stable control of the hollow core diameter.

For some configurations, a syringe pump may be used to introduce a flow of gas into (or out of) the hollow core region. In other configurations, a plunger may be disposed within the hollow core region and raised/lowered to change the volume of the core region. Similarly, an external furnace or heater may be used to change the temperature within the hollow core region and provide the self-regulation of the core diameter. Regulating combinations of gas flow, volume and/or temperature may also be employed to control the core diameter during draw.

Other embodiments of the present invention are contemplated to also regulate conditions within other hollow regions of an MCR during draw. For example, an exemplary hollow core fiber may also include one or more shunt cores and the ability to adjust and maintain the diameters of the shunt cores in accordance with the present invention is useful in controlling propagating modes within the fiber. Similarly, a set of capillaries disposed at vertices around the core region (also referred to below as "corner capillaries") may also be subjected to the inventive process of regulating conditions within their hollow centers to maintain desired geometries.

An exemplary embodiment of the present invention takes the form of a method for controlling a diameter of one or more hollow regions during fabrication of a microstructured optical fiber comprising the steps of: providing a microstructured optical preform including one or more hollow regions, drawing down the microstructured optical preform while controlling at least one of the hollow regions to exhibit and maintain a desired diameter, wherein during the drawing step a regulation of one or more draw conditions is provided by creating a change in gas flow through the at least one hollow region to compensate for the drawing process and stabilize the desired diameter of the at least one hollow region.

Another embodiment of the present invention takes the form of apparatus for controlling a diameter of one or more hollow regions during draw of a hollow core microstructure including external means coupled to at least one hollow region of a starting material for regulating conditions within the at least one hollow region during draw to maintain a desired diameter of the at least one hollow region, the one or more conditions selected from the group consisting of gas flow rate through the at least one of the hollow regions, the volume of the at least one of the hollow regions, and the temperature within the at least one of the hollow regions.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 1 is a simplified block diagram of a system that may be configured to provide controlled-diameter hollow core optical fiber formed in accordance with the present invention;

FIG. 3 is a simplified diagram illustrating an alternative arrangement for regulating conditions within the core region of a hollow core fiber, here by varying the volume within the core region, in accordance with the principles of the present invention;

DETAILED DESCRIPTION

In contrast to conventional fibers consisting of glass layers of different refractive index values, the "confinement" to the air-filled (i.e., hollow) region of the hollow core fiber is sensitive to minor changes in the photonic microstructure of the surrounding cladding, as well as to fluctuations in the core diameter. It has also been found that minor perturbations in the core diameter (which may occur in an uncontrollable manner as the material passes through the furnace during the fiber draw process, for example) can result in forming an optical fiber that cannot support the propagation of a specific wavelength range of interest.

The intent of the present invention, therefore, is to provide a means for controlling the diameter of hollow regions (including, but not limited to the hollow core region) created during the process of drawing down a hollow core optical fiber from an MCR to minimize the effects of these uncontrollable perturbations.

Figure 2:
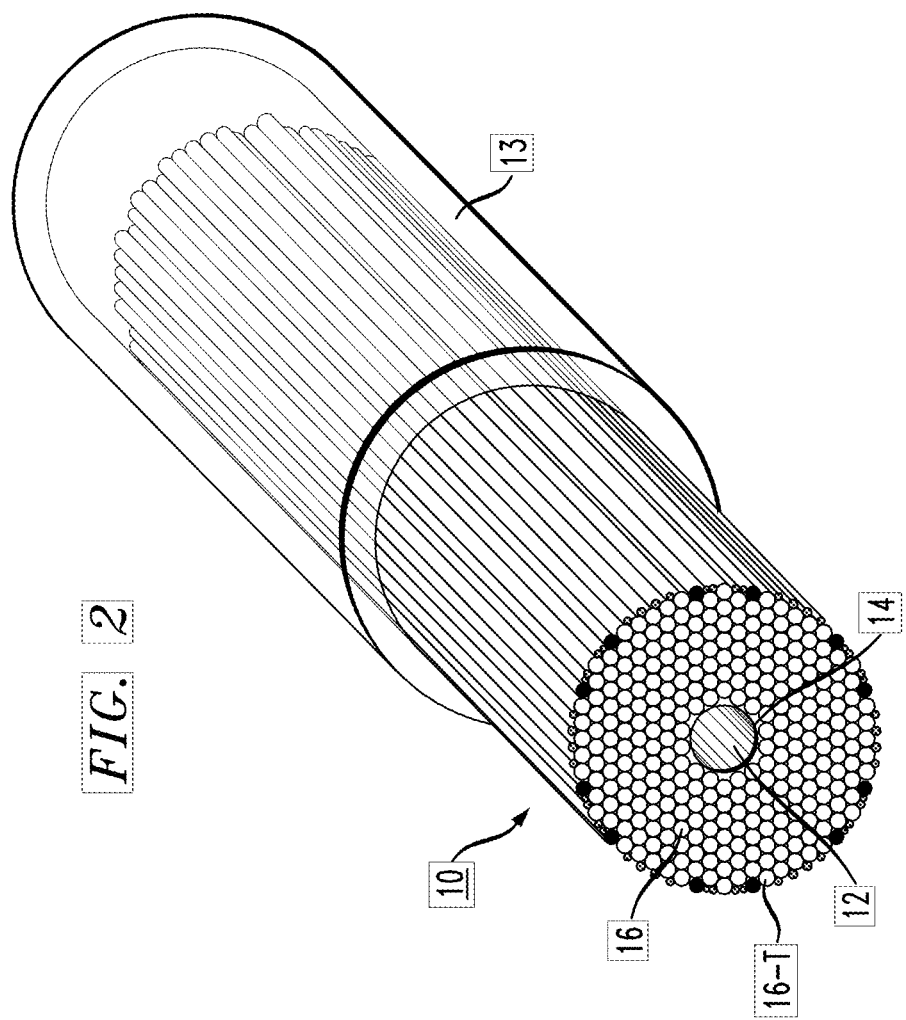
FIG. 2 is an isometric view of an exemplary multistructured core rod (MCR) that may be used as starting material in creating hollow core optical fiber in accordance with the teachings of the present invention.

FIG. 1 is a simplified diagram of an exemplary system (also referred to at times hereinafter as "apparatus") for forming an optical fiber from a preform, one exemplary preform being an MCR used in the fabrication of a hollow core fiber in accordance with the present invention. An isometric view of an exemplary MCR 10 is shown in FIG. 2. MCR 10 is shown as having a hollow core region 12, with a core tube 14 defining the outer periphery of the core region. A plurality of capillaries 16 surround hollow core region 12 and form the photonic bandgap structure of the cladding region that enables propagation of a light beam through the air-filled (i.e., "hollow") core region. MCR 10 is typically disposed within a glass tube 13, with the combination then drawn down into the final fiber structure. In a preferred process of drawing down MCR 10 to form a hollow core optical fiber, the end terminations 16-T of capillaries 16 are sealed so that self-pressurization will take place during heating and drawing (as described in the prior art).

In accordance with the principles of the present invention, and as will be explained in detail below, any hollow region within MCR 10 that needs to be controlled (such as, but again not limited to, hollow core region 12) is not sealed, but is instead subjected to a regulation of one or more condition (i.e., gas flow, volume, and/or temperature) so that the core diameter can be adjusted in size and thereafter controlled/regulated to maintain this desired diameter.

Referring back to the system/apparatus of FIG. 1, a hollow core optical fiber is formed by heating the preform including MCR 10, and drawing down the heated material (under tension) until the final fiber diameter is achieved. As shown, MCR 10 is passed through a furnace 18 and is then drawn down to the final fiber size. In accordance with this illustrative embodiment of the present invention, a pump source 20 is included in the system and utilized to provide a continuous flow of gas into core region 12 such that the size of this region will self-regulate (i.e., adjust, as needed) as the hollow core optical fiber is formed. In effect, the gas injected into core region 12 counteracts the leakage of gas from the drawn end of the fiber at the furnace exit, allowing core region 12 to stabilize at a different size than would be achieved without gas flow. The flow rate itself may be constant, may be positive or negative (i.e., added to or removed from the core region), or may be varied during the draw process.

In one particular configuration, pump source 20 comprises a syringe pump 22 that is utilized to introduce a continuous flow of a gas into core region 12. It has been found that by introducing gas to hollow core region 12 during fiber draw, the core region will tend to self-regulate in size and stabilize at a specific diameter that is different than that achieved by prior art fiber draw techniques.

It is to be understood that providing a flow of gas through hollow core region 12 (such as by the use of external pump source 20) is only one of the many contemplated arrangements for regulating conditions within hollow core region 12 during the fiber draw process. Other arrangements for regulating conditions within the hollow core region are contemplated as falling within the scope of the present invention. FIG. 3 illustrates an alternative embodiment, for example, where the volume of core region 12 is regulated. In this particular configuration for regulating volume, a plunger 30 is disposed within core region 12 and controlled to move up or down during draw. The movement of plunger 30 results in changing the volume of core region 12 as MCR 10 is being drawn down into the final form of the hollow core optical fiber. In accordance with the principles of the ideal gas law, the change in volume accomplishes the same effect as adding gas at a controlled flow rate (in particular, these parameters are inversely related), thus providing an alternative means of regulating conditions within the hollow core region.

Figure 4:
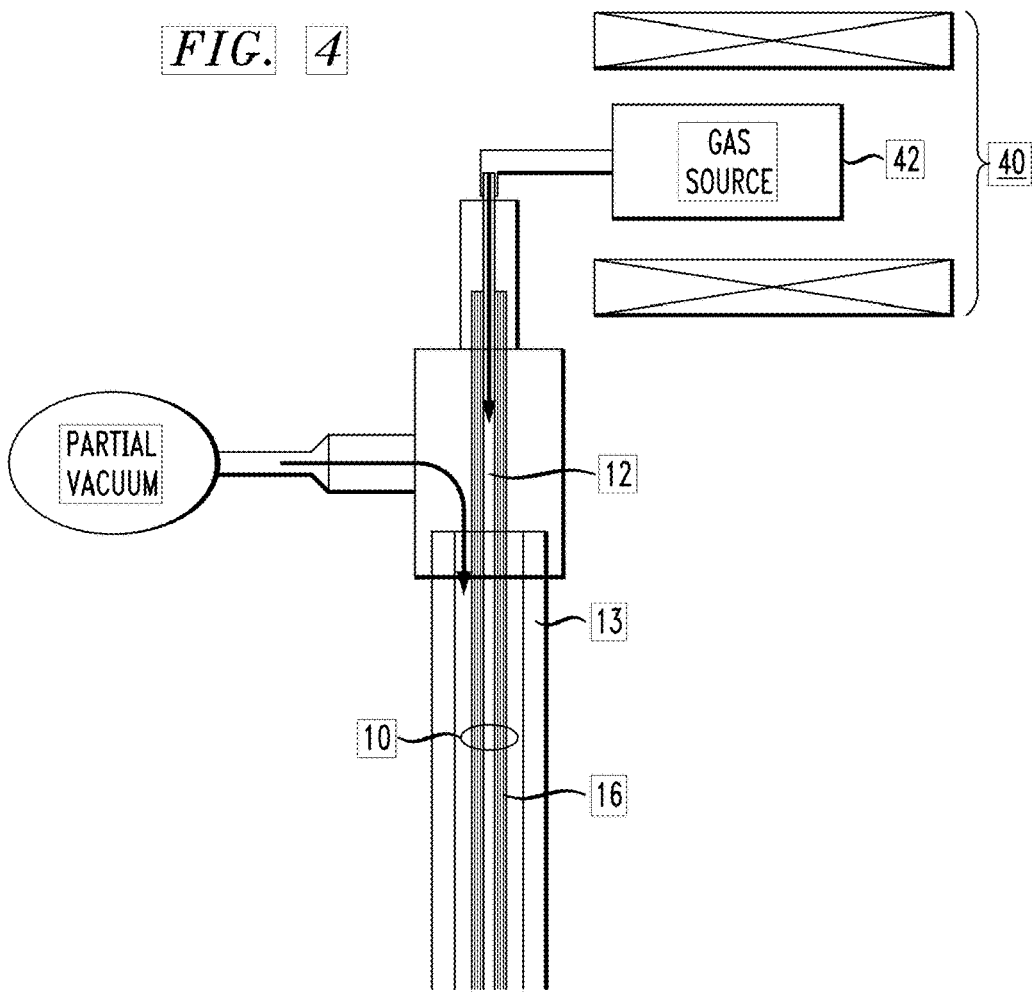
FIG. 4 is a simplified diagram of yet another arrangement for regulating conditions within the core region of a hollow core fiber, here by varying the temperature within the hollow core region.

FIG. 4 illustrates yet another embodiment for regulating conditions within hollow core region 12, here by varying the temperature within core region 12. As shown, a furnace 40 is used to heat a gas source 42 that is coupled to core region 12. As the temperature rises, the gas expands and pushes molecules of gas downward toward the bottom of core region 12.

Figure 5:
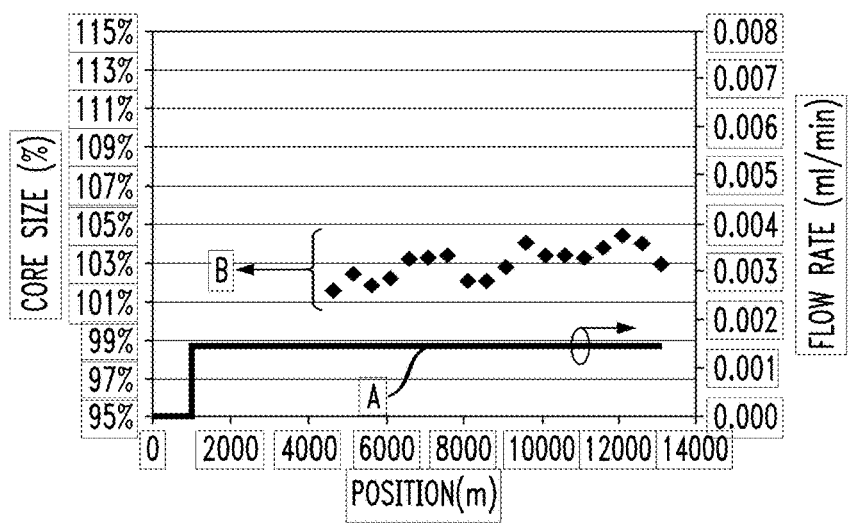
FIG. 5 contains plots showing an exemplary flow rate of gas through a hollow core region and the associated core diameter, during a process of drawing a hollow core optical fiber.

In accordance with one or more aspects of these various embodiments of present invention, the regulation of conditions within the hollow core region is used to create and maintain a desired core diameter. The regulation of conditions may be provided, for example, via delivery of a flow of gas, moving a plunger down the hollow core region, heating the gas within the hollow core region, diffusing a gas such as helium through the glass walls and into (or out of) the core region. The continuous introduction of gas, for example, has been found to provide self-regulation and additional control/stabilization (as well as initial sizing of the hollow core) when compared to the self-pressurized (sealed core) draw process of the prior art. FIG. 5 is a graph plotting an exemplary gas flow rate and core diameter for a given process of drawing an optical fiber from an MCR. The change in core size is defined as a % change from a nominal 100% pre-defined value and the flow rate is defined as ml/min. Plot A as shown in FIG. 5 illustrates a continuous application of gas at a constant flow rate of 0.00153 ml/min to the hollow core region as the MCR is passed through the furnace and drawn down into the final form of a hollow core optical fiber. Plot B is a set of data points of core size measurements along the length of the optical fiber during draw (illustrated as a percentage from the normalized 100% core diameter value). For this particular flow rate, an average core size of 103% was obtained, with a standard deviation of 0.8%. A minimum core value of 101.6% and a maximum core value of 104.4% are used as the lower and upper bounds, respectively, of this exemplary configuration.

Figure 6:
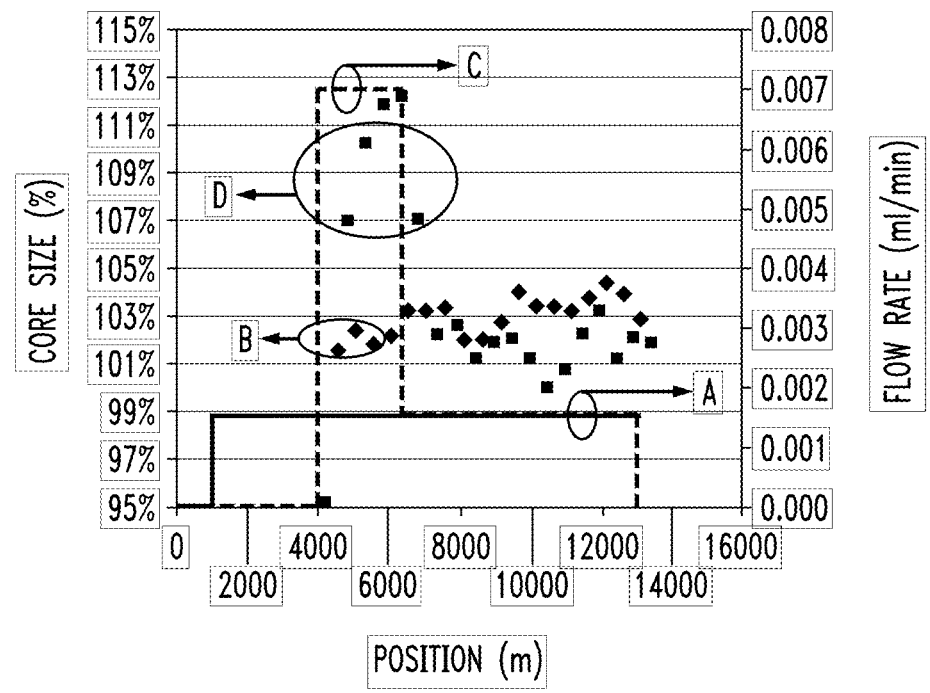
FIG. 6 contains plots showing an alternative gas flow pattern, in this case including an increase in flow for a short period of time, and its affect on the core diameter during a process of drawing a hollow core optical fiber, with the results of FIG. 3 reproduced here for comparison.

FIG. 6 contains a graph showing both the results of a constant flow rate (as in FIG. 5), as well as data collected from changing the flow rate of gas through the hollow core region during fiber draw. In the latter case, an initial flow rate of about 0.00153 ml/min was used, the same as for the constant flow rate scenario. After about 4000 meters of fiber was drawn, the flow rate was increased to about 0.0068 ml/min, and maintained at this higher flow rate value as another 2000 meters of fiber was drawn. The flow rate was then reduced to the original 0.00153 ml/min rate for the remainder of the fiber draw (shown in plot C in FIG. 6). The increase in flow rate was shown to result in an increase in core diameter (shown by data points D in FIG. 6) to upwards of 113%, with the variation in core diameter reducing to percentages similar to those associated with the constant flow embodiment when the flow rate was reduced again.

Figure 7:
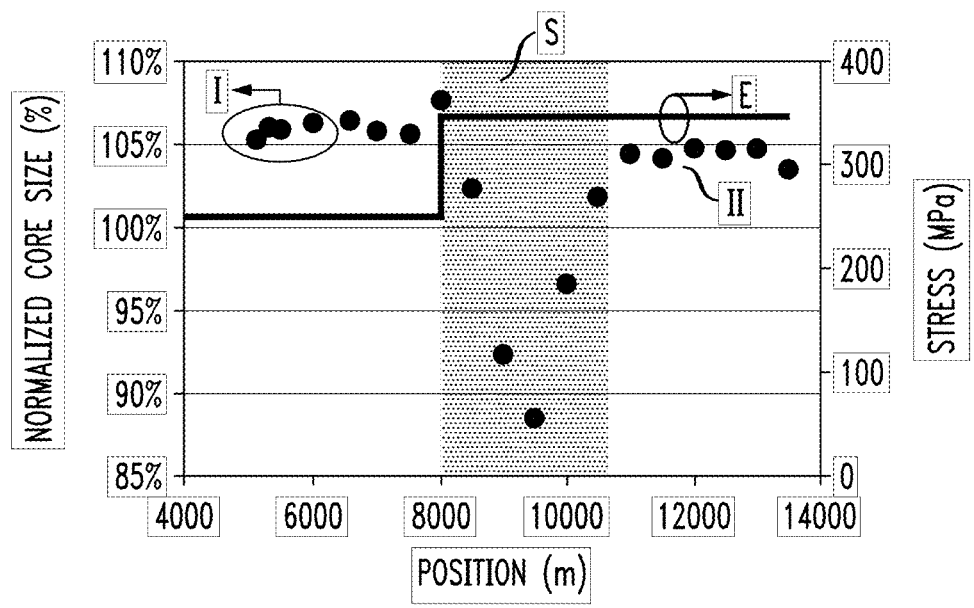
FIG. 7 contains a plot showing the ability of the core diameter to recover to a desired diameter after process perturbation (here, an increase in draw stress) in accordance with the principles of the present invention.

An advantage of utilizing such varying conditions within the hollow core region is that the diameter of the core will self-regulate and stabilize during draw in a manner that allows for perturbations in process conditions to be of little impact to the final form of the drawn fiber. FIG. 7 illustrates the self-regulating ability of the present invention in response to a drastic change in stress during fiber draw. In particular, FIG. 7 plots change in core diameter along the length of the fiber (from 4000 to 14000 meters) as the draw stress was increased from 250 MPa to 350 MPa. The increase in draw stress is shown as plot E in FIG. 7, with the change in stress shown as occurring at the position of 8000 meters along the drawn fiber. Under conventional methods of maintaining the pressure within the hollow core region, this increase in draw tension would result in a permanent reduction in core diameter. The initial downward trend of core diameter measurements immediately after the change in stress, shown by shaded region S in the core diameter plot I of FIG. 7, is related to this condition.

In contrast to the constant pressure prior art and further in accordance with aspects of the present invention, the utilization of regulating conditions within the hollow core region allows for the diameter size to recover (within a few km of draw stress change) to a value within acceptable variation of nominal, even in the presence of this undesirable tension value. As shown in region II of core diameter plot I, the core diameter recovers to its desired size within 2.5 km of the change in draw stress. While the plots of FIG. 7 are associated with the recovery of core diameter in the presence of a change in draw stress, it is to be understood that the control of the core in accordance with the present invention allows for a similar recovery to take place during other unwanted perturbations in process parameters during fiber draw.

Another feature of the present invention is that the regulating conditions may be used to essentially "prime" the selected hollow regions at the beginning of the draw process. In particular, it has been found that by injecting an additional amount of gas (for example) at the beginning of the draw, the steady-state condition with respect to the desired diameter of the hollow region is achieved at a faster rate. Generally speaking, any of the particular regulating conditions (or a combination of these conditions) of volume, temperature and gas flow may be utilized for this initialization aspect. Regarding in particular the use of initial temperature for this purpose, a heater may be disposed around the whole assembly above the draw furnace, which causes the open hollow regions to expand, accelerating the process time for reaching steady state. Alternatively, it is contemplated that a chilled preform could be used, where as it warms to room temperature the open regions will similarly expand.

Figure 8:
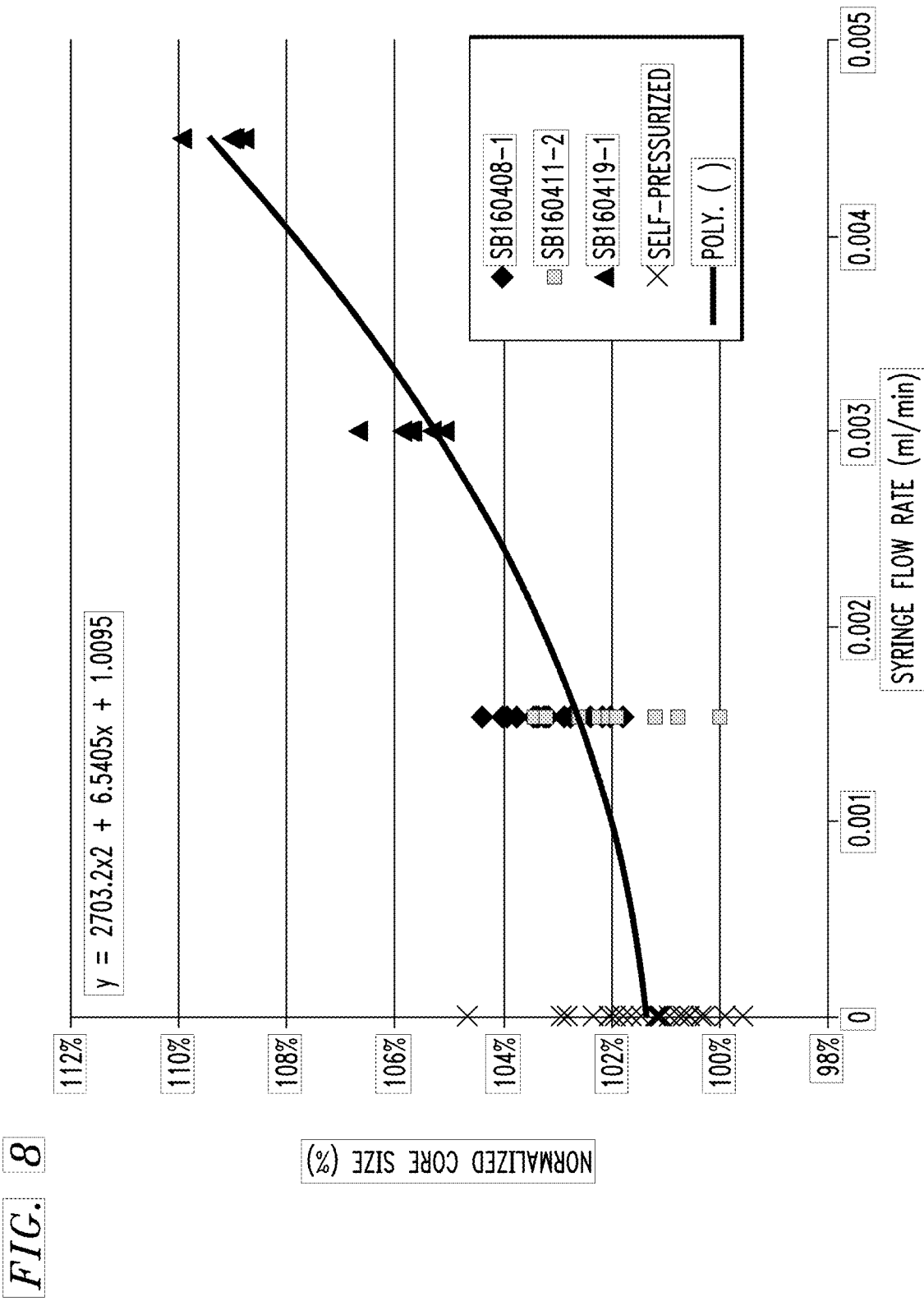
FIG. 8 is a graph showing the polynomial (second degree) relationship between flow rate through the core and normalized core diameter, according to the principles of the present invention.

It is to be recalled that one aspect of this exemplary embodiment of the present invention is that a specific, desired core diameter may be defined and maintained by knowing and controlling the flow rate of gas through the hollow core region. FIG. 8 is a graph depicting normalized core diameter as a function of different flow rates through the hollow core region. The core size variations are shown to follow a simple polynomial equation, which then allows for the determination of a specific flow rate value to be used to achieve a desired normalized core size. Thus, presuming that a desired core diameter is known a priori, a flow rate required for that diameter can be determined and then used to provide that specific hollow core diameter in the drawn hollow core optical fiber. It is to be understood that the selected flow rate is dependent on factors including, but not limited to, the cross-sectional area of the hollow core region and the feed rate of the draw tower.

Figure 9:
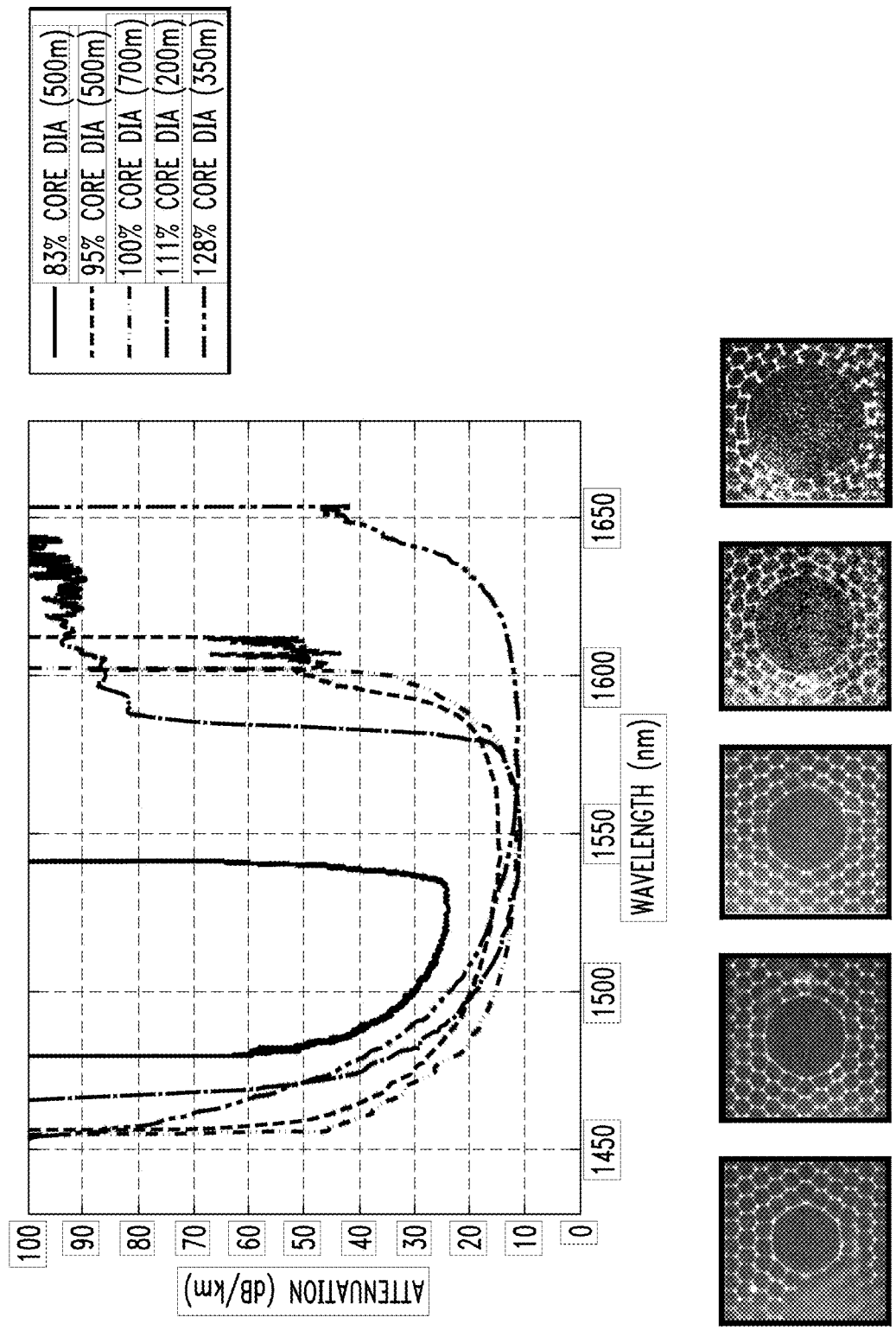
FIG. 9 shows a set of optical responses for a set of hollow core optical fibers, formed in accordance with the present invention, to have different (and controlled) diameters, with a microscopic image of a cross-section of each hollow core optical fiber also shown in FIG. 9.

Regardless of the specific method used to determine and control the core diameter of a hollow core optical fiber in accordance with the present invention, the ability to regulate the conditions within the core region also allows for a specific diameter to be modified ("tuned") for a specific purpose. FIG. 9 presents a series of graphs that illustrate the propagating wavelength associated with a set of hollow core optical fibers having different core diameters. The specific core diameter is expressed as a function of normalized core diameter, ranging from a lowest value of 83% to an upper value of 128%. Microscopic images of the core regions associated with these different core diameters are also shown.

Figure 10:
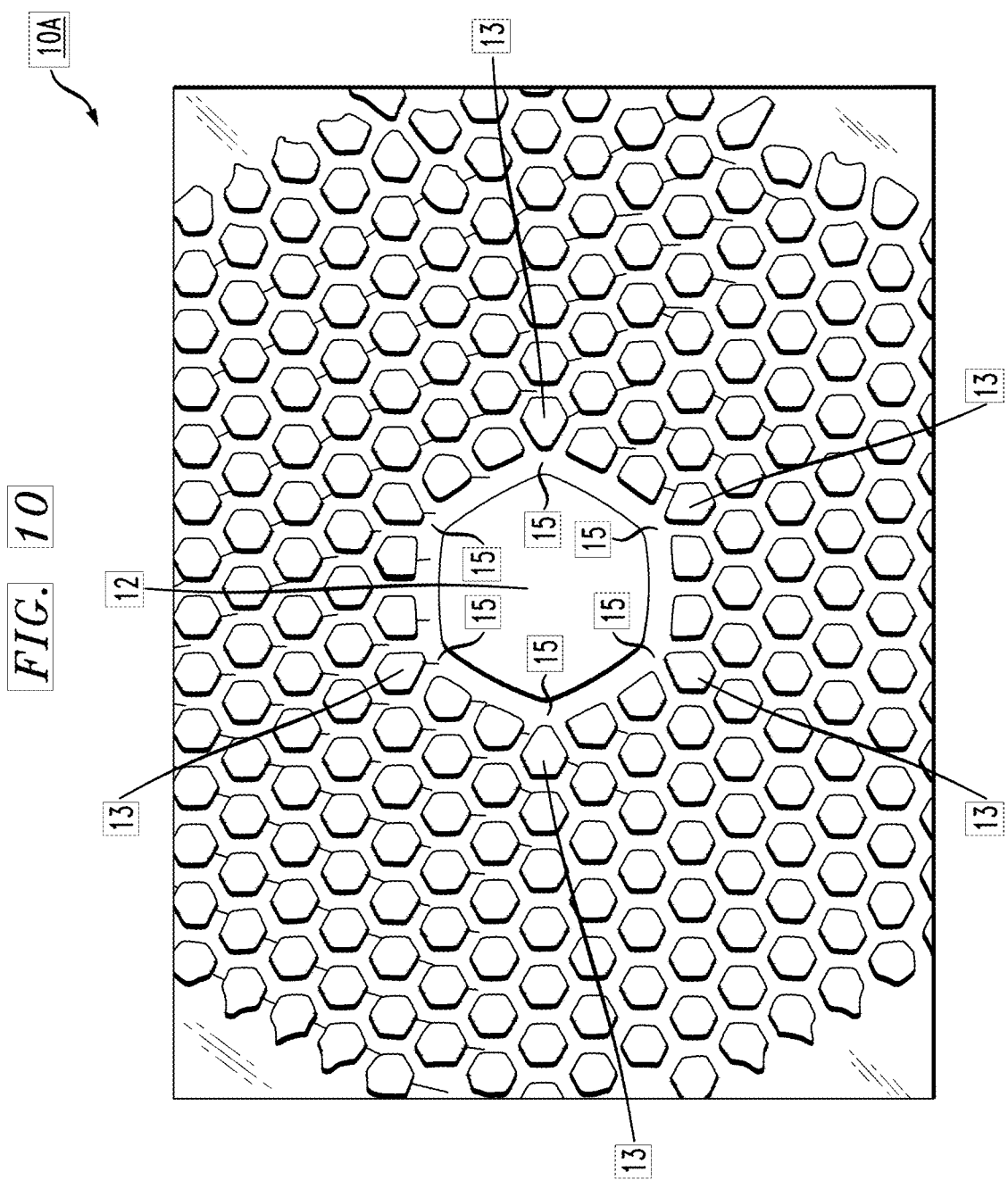
FIG. 10 illustrates an alternative hollow core fiber structure, illustrating a set of corner capillaries that may be regulated in size using the process of the present invention.
Figure 11:
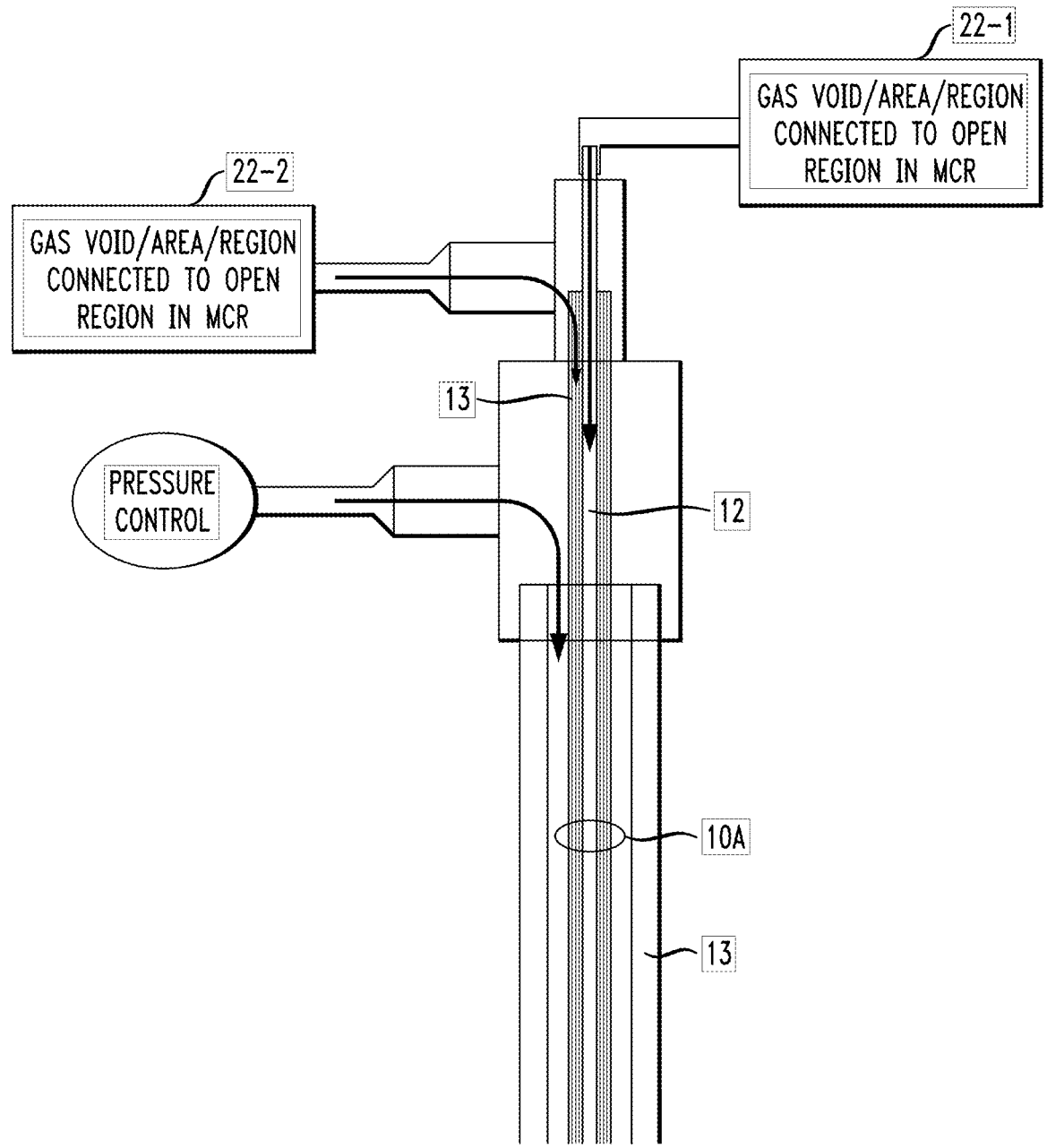
FIG. 11 is a simplified diagram of a system that may be used to regulate both a hollow core region and a set of other hollow regions in accordance with the present invention.

While in many cases control of the core diameter is of primary concern in the formation of a hollow core fiber, it may be useful to apply the techniques of the present invention to regulating conditions within any hollow region(s) of the MCR during fiber draw. For example, FIG. 10 illustrates an exemplary MCR 10A and a set of corner capillaries 13 disposed at vertices 15 around core region 12. The ability to control the size and shape of corner capillaries is considered to improve optical properties of the drawn fiber, including the bandwidth of the fiber. In a preferred embodiment, hollow core region 12 is also regulated while these corner capillaries are also controlled. FIG. 11 illustrates an exemplary system useful for regulating conditions within both central core region 12 and corner capillaries 13. In this particular system, a first syringe pump 22-1 is used to provide a gas flow, at a first predetermined rate, through core region 12. A second syringe pump 22-2 is used to provide a gas flow at a second predetermined rate through one or more corner capillaries 13. It is to be understood that combinations of different means for regulating conditions within the hollow regions may be utilized; for example, a plunger may be used to change the volume within the hollow core region and one or more syringe pumps may be used to provide a gas flow through corner capillaries.

Figure 12:
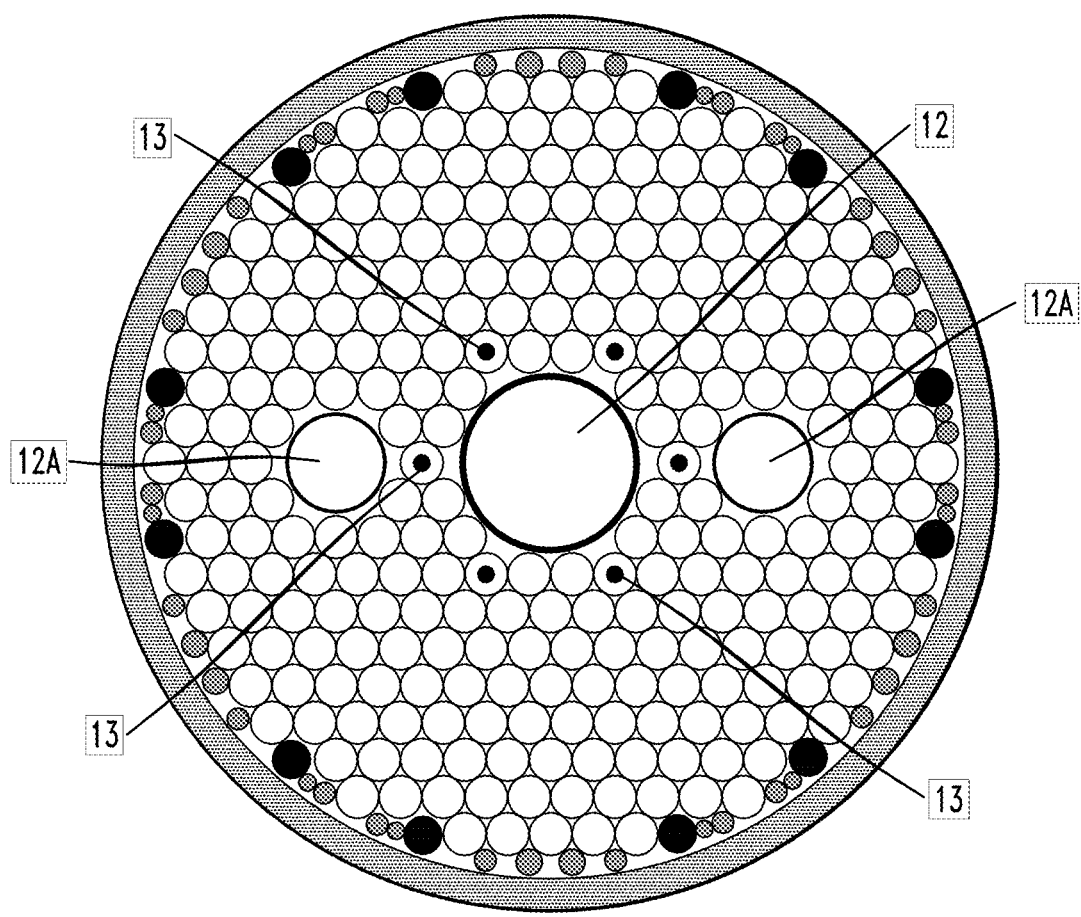
FIG. 12 illustrates yet another type of hollow core fiber structure that may be formed using the process of the present invention to regulate conditions within hollow shunt regions as well as the hollow core region.

FIG. 12 illustrates yet another type of hollow core fiber that is well-suited for draw using the process of the present invention. In this case, the hollow core fiber includes a pair of shunts 12A disposed on either side of core region 12. Shunts 12A are also hollow regions, typically of somewhat smaller diameter than central core region 12. Shunts 12A are used to out-couple unwanted propagating modes from central core region 12 and, therefore, the ability to control the diameters of shunts 12A is useful in defining the modes that are removed from the central core region.

While the various embodiments described above are based on the use of a syringe pump/plunger to introduce and control a gas flow rate (N) within a hollow core region, other embodiments of the present invention may utilize alternative methods to obtain the same result. Indeed, in association with the properties of the ideal gas law (P a NT/V), it is also possible to modify the temperature (T) or the volume (V) within the hollow core region to configure and maintain a desired core diameter. Inasmuch as the hollow region diameter will stabilize at a value determined, in large part, by the leakage of gas through the drawn fiber end at the furnace exit, gas flow (dN/dt) is used as a control parameter. In particular dN/dt d(V/T)/dt, so any combination of V and/or T that produces the desired dN/dt into or out of the hollow region will result in a stable size of that region.

While the foregoing description includes details that will enable those skilled in the art to practice the present invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A method for controlling a diameter of one or more hollow regions during fabrication of a microstructured optical fiber comprising the steps of:
   providing a microstructured optical preform including one or more hollow regions;
   drawing down the microstructured optical preform so as to control at least one of the hollow regions to exhibit and maintain a desired diameter, wherein during the drawing down step, performing the step of:
   providing a self-regulation of one or more conditions within the at least one of the hollow regions such that the desired diameter is stabilized, wherein the one or more conditions comprises continuously changing volume of the at least one of the hollow regions.

2. The method as defined in claim 1 wherein
   prior to initiating the drawing down step, the method further comprises sealing open ends of the microstructured optical preform, except for selected hollow regions, to create self-pressurization of portions of the microstructured optical preform surrounding the selected hollow regions during the drawing down step.

3. The method as defined in claim 1 wherein in performing the providing step, the provided microstructured optical preform includes a hollow core region.

4. The method as defined in claim 1 wherein in performing the providing step, the provided microstructured optical preform includes at least one hollow shunt region.

5. The method as defined in claim 1 wherein in performing the providing step, the provided microstructured optical preform includes a set of corner capillaries disposed around one or more hollow regions.

6. The method as defined in claim 1 wherein in performing the providing step, the provided microstructured optical preform includes a hollow core region and a set of corner capillaries disposed at vertices of the hollow core region.

7. The method as defined in claim 1 wherein in performing the providing step, the provided microstructured optical preform includes a hollow core region and at least one shunt region.

8. The method as defined in claim 1 wherein the step of providing the self-regulation of one or more conditions further comprises providing a continuous flow of gas through the at least one hollow region.

9. The method as defined in claim 1 wherein the step of providing the self-regulation of one or more conditions further comprises continuously changing a temperature within the at least one hollow region.

10. A method for controlling a diameter of one or more hollow regions during fabrication of a microstructured optical fiber comprising the steps of:
    providing a microstructured optical preform including one or more hollow regions;
    drawing down the microstructured optical preform so as to control at least one of the hollow regions to exhibit and maintain a desired diameter, wherein during the drawing down step, performing the step of:
    self-regulating the maintaining of the desired diameter by creating a change in gas flow through the at least one hollow region to compensate for the drawing down step, stabilizing the desired diameter of the at least one hollow region, wherein the change in gas flow is provided by changing a volume of the at least one hollow region.

11. The method as defined in claim 10 wherein the change in gas flow is provided by introducing a gas flow into or out of the at least one hollow region.

12. The method as defined in claim 10 wherein the change in gas flow is further provided by changing a temperature within the at least one hollow region.

13. The method as defined in claim 10 wherein the drawing down step further comprises
    injecting an additional amount of gas at the beginning of the drawing down step to prime the at least one hollow region to achieve a steady state in hollow region diameter.

* * * * *